United States Patent [19]

Bartz

[11] 4,002,207
[45] Jan. 11, 1977

[54] EARTHWORKING TOOL WITH HANDLE HAVING TRIANGULARLY ARRANGED SIDES

[76] Inventor: Richard O. Bartz, 7017 Mark Terrace Drive, Edina, Minn. 55435

[22] Filed: Sept. 18, 1975

[21] Appl. No.: 614,507

[52] U.S. Cl. .............................. 172/378; 16/110 R; 172/371; 172/375; 172/381; 294/55
[51] Int. Cl.² .......................... A01B 1/04; A01B 1/14
[58] Field of Search .......... 172/371, 375, 378, 380, 172/381; D8/6, 7, 9, 10, 11, 13, 82, 83, 107; 294/49, 51, 55; 16/110 R

[56] References Cited

UNITED STATES PATENTS

| 190,459 | 5/1877 | Wilkinson | D8/83 UX |
|---|---|---|---|
| 1,713,529 | 5/1929 | Grant | 294/51 |
| 2,164,373 | 7/1939 | Ayliffe | 172/380 X |
| D166,332 | 4/1952 | Melich et al. | D8/6 |
| D208,995 | 10/1967 | Anderson et al. | D8/10 |
| D230,695 | 3/1974 | Bartz | D8/9 |
| D237,451 | 11/1975 | Bartz | D8/9 |

OTHER PUBLICATIONS

"The New Stanley Workmaster Triangular Grip Screwdrivers", May, 1969.

*Primary Examiner*—Richard T. Stouffer
*Attorney, Agent, or Firm*—Burd, Braddock & Bartz

[57] ABSTRACT

A hand tool used to manage and cultivate soil in confined areas, as planters and pots, for growing plants. The tool has an elongated handle having an end integral with an earthworking implement. The handle has triangularly related linear sides which taper inwardly toward the earthworking implement, wherein the sides are adapted to be engaged by the first and second fingers and thumb of the user. On the end of the handle opposite to the earthworking implement, the sides converge into a cylindrical section terminating in a knob. The earthworking implement includes a body having a plurality of teeth. The body can be in the shape of a shovel, pick or rake.

14 Claims, 20 Drawing Figures

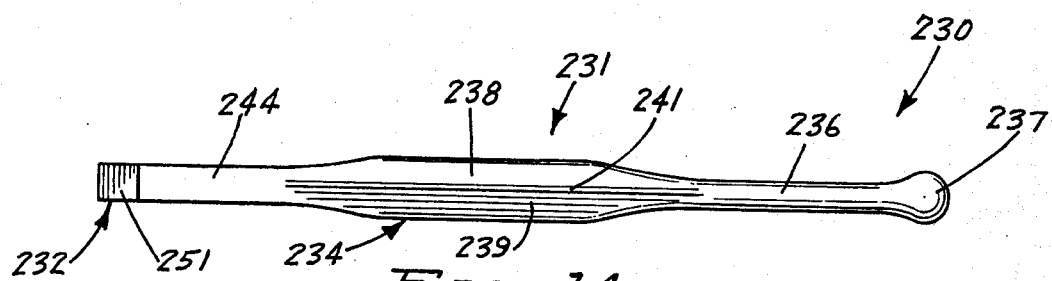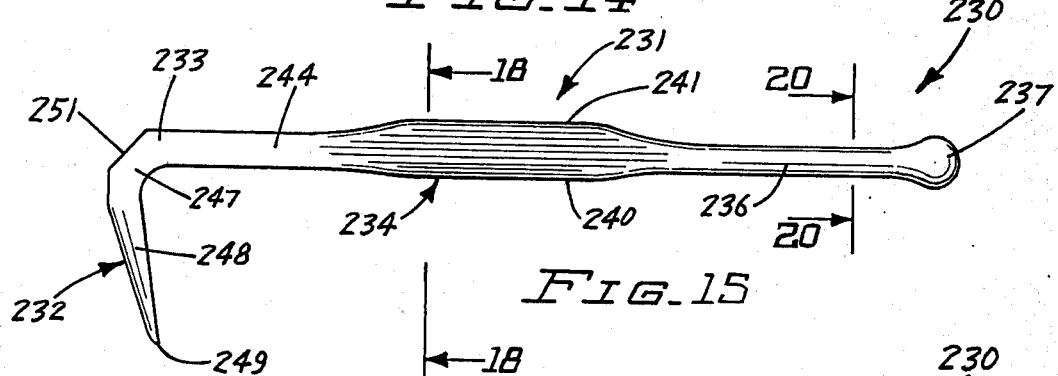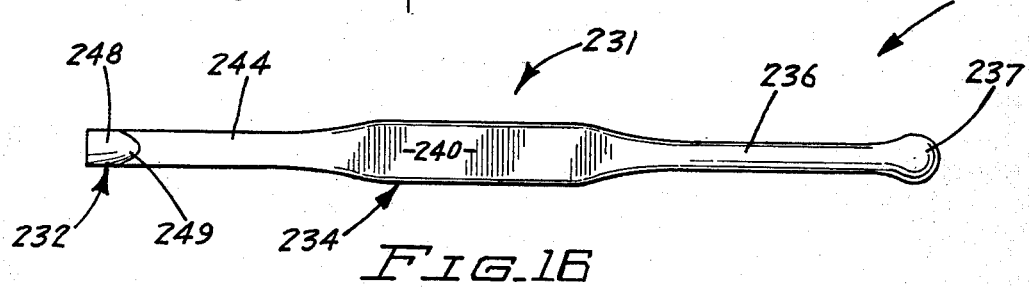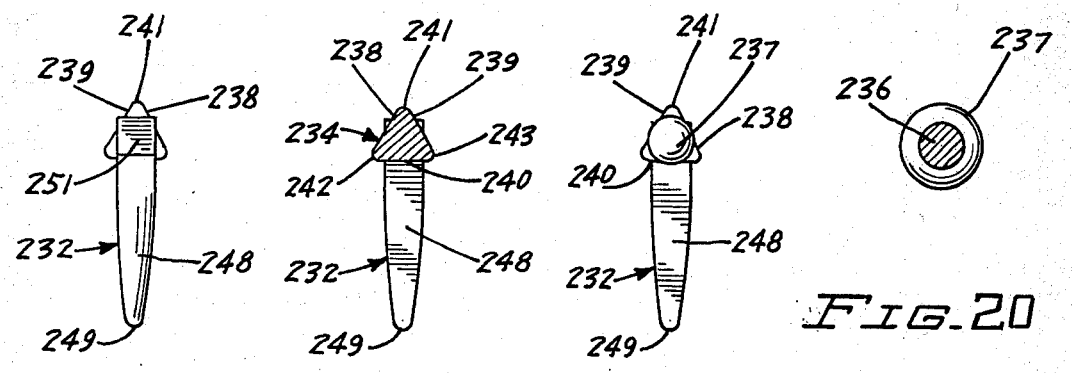

EARTHWORKING TOOL WITH HANDLE HAVING TRIANGULARLY ARRANGED SIDES

BACKGROUND OF THE INVENTION

The invention is directed to hand manipulated earthworking implements used by botanists and gardeners to manage and cultivate the soil. It is an accepted practice to periodically work and loosen the soil in potted plants to minimize evaporation of moisture from the soil and incorporate air and fertilizers into the soil. Common kitchen utinsels, as knives, forks and spoons, are sometimes used as earthworking tools. The kitchen utinsels are awkward to use as the handles are not compatible with the hand and the utinsel is not adapted to effectively work the soil. Miniature shovels and rakes have been developed for use in planters and pots for plants. These implements have cylindrical handles attached to shovellike blades. These earthworking hand tools are generally functional but are not readily usable for precise and meticulous work in the management and cultivation of soil in planters, pots and other confined areas.

SUMMARY OF INVENTION

The invention broadly relates to a hand operated implement for working and managing the soil. More particularly, the invention is directed to a botanist's tool having an elongated handle attached to an earthworking implement. The handle has a linear midsection with three longitudinal sides located in a general triangular arrangement. The forward end of the handle tapers inwardly and is integrally attached to the midportion of the earthworking implement. The outer end of the handle has a cylindrical configuration which terminates in a spherical knob. The earthworking implement is an elongated body in the nature of a blade having a curved forward nose. One side of the body has a plurality of teeth. In another form of the earthworking implement, the body has a plurality of downwardly directed teeth to form a rake. In another form of the invention, the tool comprises a downwardly directed tooth. The upper end of the tooth has a flat head which can be used to compress the soil.

An object of the invention is to provide a single functional botanist's tool usable to work the soil, as transporting soil, preparing holes in the soil and cutting furrows into the soil. A further object of the invention is to provide an earthworking tool with a hand fitted handle having triangularly arranged linear sides adapted to be engaged by the first and second finger and thumb of the user which permits the application of considerable force to the tool and yet provide for the accurate control of the tool. Another object of the invention is to provide an earthworking hand tool that is compatible with the ecological environment, durable in use and can be economically recycled. Yet another object of the invention is to provide a hand manipulated botanist's tool that is versatile in use, effective and efficient in operation in all types of soil and facilitates removal of vegetation from the soil. These and other objects and advantages of the botanist's tool of the invention are apparent and reside in the details of construction and operation more fully hereinafter described and claimed.

IN THE DRAWINGS

FIG. 1 is a top plan view of a first form of the earthworking hand tool of the invention;

FIG. 2 is a side elevational view of FIG. 1;
FIG. 3 is a bottom plan view of FIG. 1;
FIG. 4 is a front elevational view of FIG. 1;
FIG. 5 is a rear elevational view of FIG. 1;
FIG. 6 is an enlarged sectional view taken along line 6—6 of FIG. 2;
FIG. 7 is an enlarged sectional view taken along line 7—7 of FIG. 2;
FIG. 8 is a top plan view of a second form of the earthworking hand tool of the invention;
FIG. 9 is a side elevational view of FIG. 8;
FIG. 10 is a bottom plan view of FIG. 8;
FIG. 11 is a front elevational view of FIG. 8;
FIG. 12 is a sectional view taken along line 12—12 of FIG. 9;
FIG. 13 is an enlarged sectional view taken along line 13—13 of FIG. 9;
FIG. 14 is a top plan view of a third form of the earthworking tool of the invention;
FIG. 15 is a side elevational view of FIG. 14;
FIG. 16 is a bottom plan view of FIG. 15;
FIG. 17 is a front elevational view of FIG. 15;
FIG. 18 is a sectional view taken along line 18—18 of FIG. 15;
FIG. 19 is a rear elevational view of FIG. 15; and
FIG. 20 is an enlarged sectional view taken along line 20—20 of FIG. 15.

DESCRIPTION OF PREFERRED EMBODIMENTS:

Figure 1:
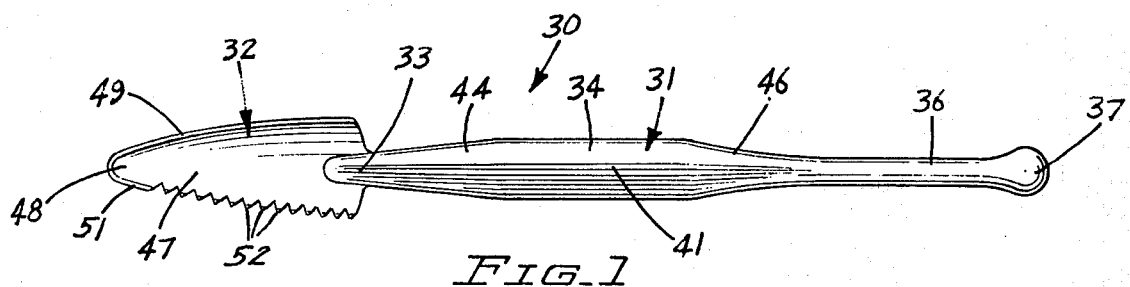
Figure 2:
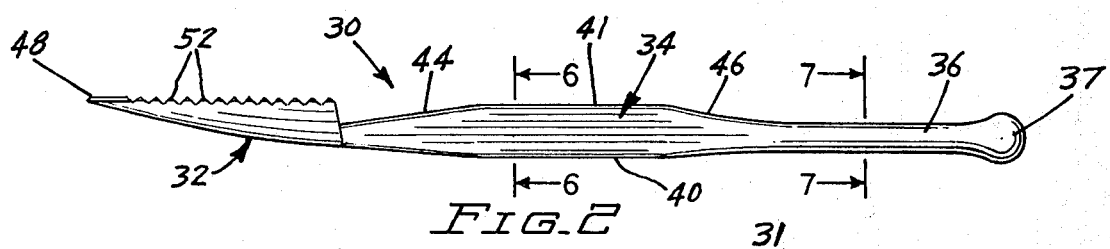
Figure 3:
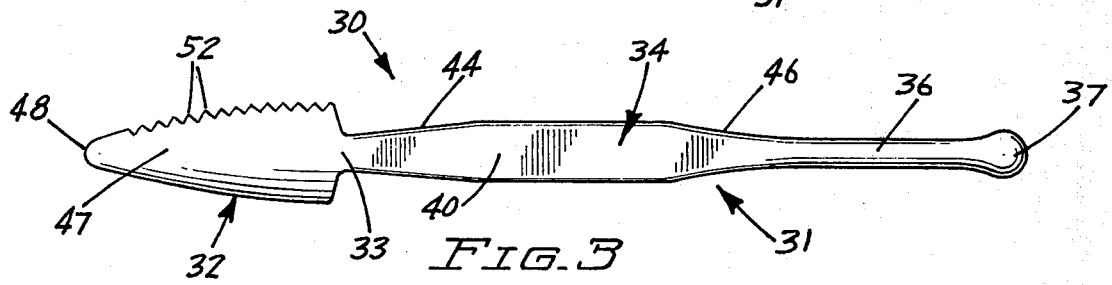
Figure 4:
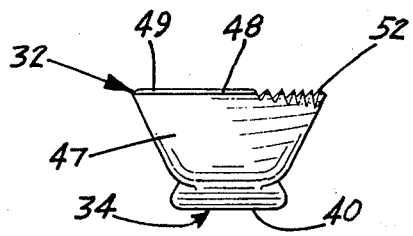
Figure 6:
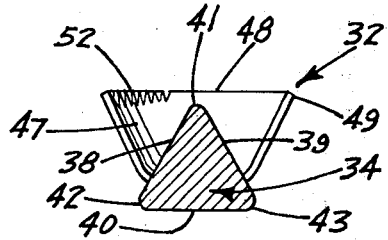
Figure 5:
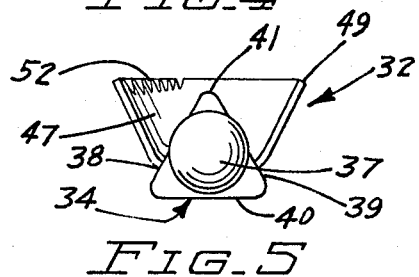
Figure 7:
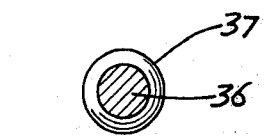

Referring to the drawing, there is shown in FIGS. 1–7 an earthworking hand tool or botanist's tool indicated generally at 30 for use in the management and cultivation of soil in confined areas, as planters and pots. Tool 30 has an elongated linear handle 31 integral with an earthworking implement 32. Handle 31 has a first end section 33 integral with the rear end of implement 32. Section 33 is joined with a midsection 34 which extends to an end section 36. As shown in FIG. 7, end section 36 is a cylindrical section having a circular cross section. End section 36 terminates in a spherical knob or bulb 37. Knob 37 has a diameter larger than the diameter of the section 36.

Midsection 34 has a triangular shaped cross section as shown in FIG. 6. Section 34 has flat linear sides 38, 39 and 40 located relative to each other in an equilateral triangular arrangement. The sides 38 and 39 converge upwardly and terminate in a top longitudinal rib 41. Rib 41 is located in the vertical longitudinal plane that extends through the longitudinal axis of handle 31. Bottom side 40 is located along a generally horizontal plane and is joined with the sides 38 and 39 with longitudinal linear rounded corners 42 and 43.

Midsection 34 has a triangular shaped neck portion 44 that tapers forwardly and inwardly toward the end section 33. Section 34 also has a rear portion 46 joined to the second end section 36. Rear portion 46 has a triangular configuration and tapers rearwardly and inwardly to the end section 36. The shape of the adjacent portions of end section 36 and portion 46 is a gradual transition from a triangular shape to a circular shape.

Earthworking implement 32 has a shovel shape comprising a generally U-shaped body 47. The forward end of body 47 has a convex curved nose 48 which merges with a curved side 49 having a linear edge. The opposite portion of nose 48 is joined to a second side 51 having a plurality of outwardly open teeth 52. Teeth 52 extend from the back of the body in series toward the nose 48. The first tooth is spaced rearwardly of the nose whereby a short linear edge 51 is located between the end of the nose 48 and the first tooth.

An example of one form of the earthworking hand tool 30 is as follows. The entire tool is cast aluminum having an overall length of 17 cm. The handle has a length of 12 cm. The earthworking implement 32 has a length of 5 cm. The length of sides 38, 39 and 40 shown in FIG. 6 are equal and are 1.4 cm. Midsection 34 has a length of 8 cm. The diameter of end section 36 is 1 cm. The knob has a diameter of 1.5 cm. Body 47 has a rear end of 2 cm. and has 12 teeth. Other shapes and sizes of teeth can be incorporated in the edges 51 of the body 47. Body 47 at its rear end has a height of 1 cm. Tool 32 can be made of other structural materials as plastic and metals other than aluminum.

In use, the tool 30 is digitally manipulated with the first and second finger and thumb. The thumb is placed in engagement with the side 38 and concurrently with the engagement of the first finger and side 39. The second finger engages the bottom side 40. The rear portion 46 or end section 38 is located in the space between the thumb and first finger. The earthworking implement 32 can be moved relative to the soil to dig, scrape, cut and carry soil as desired.

Referring to FIGS. 8–13, there is shown a second embodiment of the botanist's tool of the invention indicated generally at 130. Tool 130 has an elongated handle 131 integrally attached to an earthworking implement 132. Implement 132 is in the nature of a rake having a plurality of fingers or teeth 148-151 spaced from each other. Handle 131 has a first end section 133 integral with the rear end of the implement 132. Section 133 is joined with a midsection 134. A cylindrical end section 136 is attached to the midsection 134. End section 136 terminates in a spherical knob or bulb 137. Knob 137 has a size or diameter larger than section 136.

Figure 13:
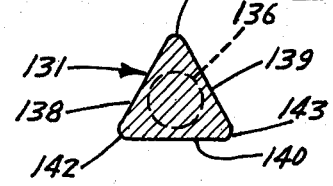

Midsection 134 has a triangular shaped cross section, as shown in FIG. 13. Section 134 has flat linear sides 138, 139 and 140 having substantially equal lengths and widths and located in an equilateral triangular arrangement. The forward portions of the sides 138, 139 and 140 converge toward the end section 133. A longitudinal rib 141 extends along the top of the handle from the section 136 to the end 133. The bottom side 140 is located in a general horizontal plane and is joined with sides 138 and 139 by longitudinal linear rounded corners 142 and 143.

Figure 9:
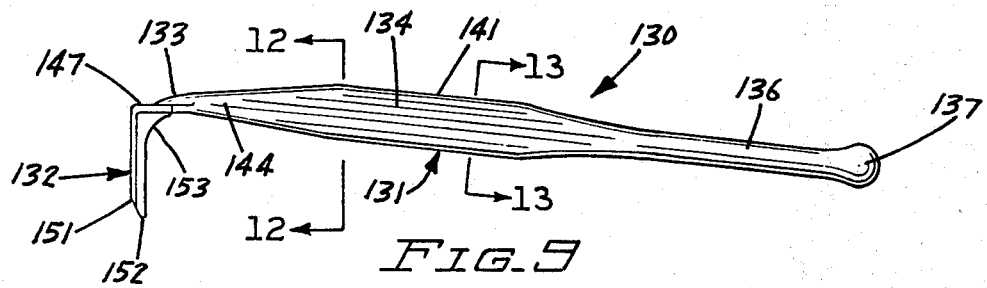
Figure 10:
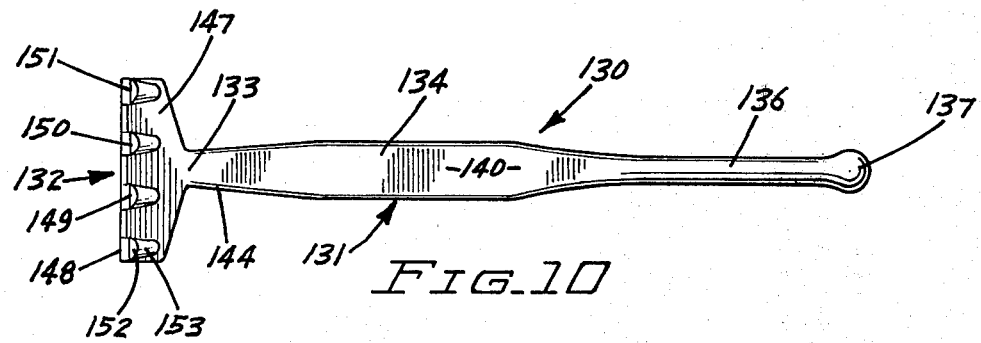
Figures 11, 12:
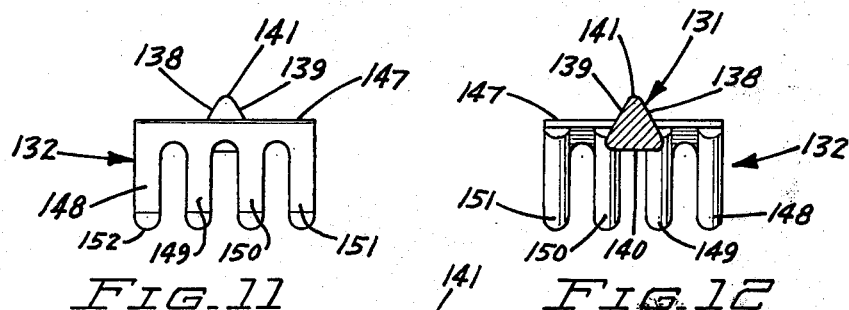

The converging tapered portion of the midsection forms a neck portion 144 which gradually reduces in size toward the end 133. The earthworking implement 132 has a rake comprising a transverse body 147 having a plurality of teeth 148, 149, 150 and 151. As shown in FIGS. 11 and 12, teeth 148–151 have a linear shape and extend downwardly or normally to the transverse body 147. Adjacent teeth are spaced from each other about the width of a tooth, with the length of each tooth being about three times its width. Each tooth has a lower or terminal rounded nose 152 and an upper base 153 where the tooth is joined to the body 147. As shown in FIG. 9, the base 153 has a convex curved configuration to facilitate movement of soil between the teeth and minimize the collection of soil on the teeth.

Figure 8:
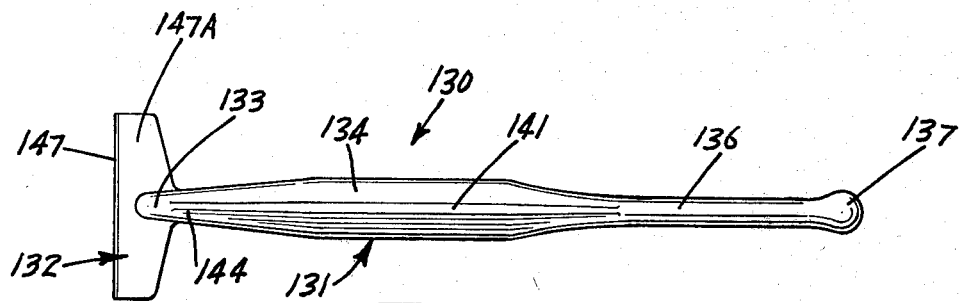

As shown in FIG. 8, the top body 147 has a generally flat transverse surface 147A. This surface is usable to compact and break up lumps in the soil. This is accomplished by inverting the tool and using the surface 147A as a tamping or smoothing surface.

The tool 130 can be made from cast aluminum or other structural materials, as plastic or metals other than aluminum. The structural dimensions of the handle can be the same as the example described with respect to the hand tool 30. Other dimensions and size relationships can be used without departing from the invention.

Referring to FIGS. 14–20, there is shown a third embodiment of the earthworking hand tool of the invention indicated generally at 230. Tool 230 is a pick-like tool having an elongated linear handle 231 integrally attached to an earth-working implement 232. Handle 231 has a first end section 233, a midsection 234 and a second end section 236 terminating in a spherical knob or bulb 237. The midsection of the handle has an equilateral triangular arrangement and comprises linear sides 238, 239 and 240. The sides 238 and 239 converge upwardly and form a longitudinal rib 241 that extends down the top of the handle. The side 240 is a bottom side and is joined with rounded corners 242 and 243 to the sides 238 and 239 respectively. Midsection 234 is attached to a neck 244 leading to the earthworking tool 232.

The earthworking tool 232 has a body 247 carrying a single downwardly directed tooth 248. Tooth 248 terminates in a rounded nose portion 249. As shown in FIG. 15, tooth 248 is at a slight forwardly directed angle and has a curved back side. The front of tooth 248 is flat. The top of the body has a flat head or surface 251 which serves as a compressing and compacting surface. Surface 251 extends at an angle of about 45° with respect to the longitudinal axis of the handle 231.

The entire tool can be made of cast aluminum and can have the same size and shape and the example of the tool 30 hereinbefore described. Other types of structural materials, as plastics and metals other than aluminum, can be used to make the tool.

The tool 230 is digitally manipulated with a first and second finger and thumb of the user. The thumb is placed in engagement with the side 238. The first finger engages side 239 and the second finger engages the bottom side 240. The cylindrical section 236 fits into the space between the thumb and first finger. The earthworking implement 232 can be moved relative to the soil to dig, scrape, and furrow the soil. Alternatively, the tool can be rotated 180° so that surface 251 can be used to compact the soil.

While there have been shown and described preferred embodiments of the earthworking hand tool of the invention, it is understood that changes in the size, shape and material can be made by those skilled in the art without departing from the invention. For example, the earthworking tool can be provided with two or three teeth.

The embodiments of the invention in which an exclusive property or privilege is claimed are defined as follows:

1. An earthworking tool comprising: an elongated handle having a longitudinally elongated cylindrical end section, a longitudinally elongated midsection having a first end and a second end, said first end being joined to the cylindrical section, said midsection extending along the longitudinal axis of the cylindrical section, said misection having outside first, second and third flat linear sides, said sides being located in a general triangular arrangement relative to each other whereby the midsection of the handle can be gripped with the first and second finger and thumb of the hand, said midsection of the handle having a longitudinal rib extended along the top of the handle in vertical alignment with the longitudinal axis of the handle, and a neck portion having one end adjacent the second end, said neck portion having first, second and third sides located in general triangular arrangement which extend in such configuration along substantially the entire length of the neck portion, said neck portion tapering inwardly along substantially its entire length in the direction away from said second end, and means for working the soil attached to the end of the neck portion opposite the second end of the midsection.

2. The tool of claim 1 wherein: the handle includes a spherical knob integral with the free end of the cylindrical section.

3. The tool of claim 2 wherein: the diameter of the spherical knob is larger than the diameter of the cylindrical section.

4. The tool of claim 1 wherein: the means for working the soil includes at least one tooth.

5. The tool of claim 1 wherein: the means for working the soil includes a body having a nose.

6. The tool of claim 1 wherein: the means for working the soil includes a body having a plurality of teeth.

7. The tool of claim 6 wherein: the body is located transversely of the handle, said plurality of teeth extended at an angle relative to said body.

8. The tool of claim 1 wherein: the means for working the soil includes a body having a top surface usable to compress and compact the soil.

9. The tool of claim 1 wherein: the means for working the soil comprises a single tooth extended at an angle relative to the longitudinal axis of the handle.

10. The tool of claim 9 wherein: the means for working the soil includes a surface facing away from the tooth for compacting the soil.

11. An earthworking tool comprising: an elongated handle having a longitudinally elongated midsection having a first end and a second end, said midsection having outside first, second and third flat linear sides, said sides being located in a general triangular arrangement relative to each other whereby the midsection can be gripped with the first and second finger and thumb of the hand for manipulating the tool, said midsection of the handle having a longitudinal rib extended along the top of the handle, and a neck portion having a first end and a second end, said first end of the neck portion being attached to the second end of the midsection, said neck portion having first, second and third sides located in general triangular arrangement which extend in such configuration along substantially the entire length of the neck portion, said neck portion tapering inwardly along substantially its entire length in the direction away from said second end of the midsection, and means for working the soil attached to the second end of the neck portion.

12. The tool of claim 11 wherein: the handle includes an end section attached to the first end of the midsection, and spherical-like knob attached to the free end of the end section.

13. The tool of claim 11 wherein: the means for working the soil includes at least one tooth.

14. The tool of claim 11 wherein: the means for working the soil has a body having a plurality of teeth.

* * * * *